United States Patent
Mouttet

(10) Patent No.: US 7,488,950 B2
(45) Date of Patent: Feb. 10, 2009

(54) CROSSWIRE SENSOR

(76) Inventor: Blaise Laurent Mouttet, 6380 Michael Robert Dr., Springfield, VA (US) 22150

(*) Notice: Subject to any disclaimer, the term of this patent is extended or adjusted under 35 U.S.C. 154(b) by 498 days.

(21) Appl. No.: 11/446,223

(22) Filed: Jun. 5, 2006

(65) Prior Publication Data

US 2008/0067387 A1 Mar. 20, 2008

(51) Int. Cl.
*H01L 27/146* (2006.01)
(52) U.S. Cl. .................... 250/397; 250/370.08
(58) Field of Classification Search ............. 250/397, 250/370.01, 370.08
See application file for complete search history.

(56) References Cited

U.S. PATENT DOCUMENTS

| 4,618,767 | A | 10/1986 | Smith et al. |
| 4,837,435 | A | 6/1989 | Sakuhara et al. |
| 6,246,102 | B1 * | 6/2001 | Sauerbrey et al. ............ 257/529 |
| 7,030,408 | B1 | 4/2006 | Kuekes et al. |
| 7,042,003 | B2 | 5/2006 | Jang et al. |
| 7,105,829 | B2 * | 9/2006 | Sato et al. ............... 250/370.09 |

* cited by examiner

*Primary Examiner*—Kiet T Nguyen

(57) ABSTRACT

A sensor array is formed using sensor elements including first and second intersecting arrays of wires separated by radiation sensitive material. A common signal is input to the first array of the wires and signals from the second array of wires are summed to produce an output signal. The state of the radiation sensitive material is altered by incident radiation transmitted between the wiring and determines the value of the output signal. A plurality of the sensor elements arranged in columns and rows form the sensor array and may be used for a plurality of image analysis applications including pattern recognition and image tracking. Nanowires may be used as the intersecting arrays of wires and the sensor array may be combined with a parallel electron beam source to form a compact electron microscope.

20 Claims, 10 Drawing Sheets

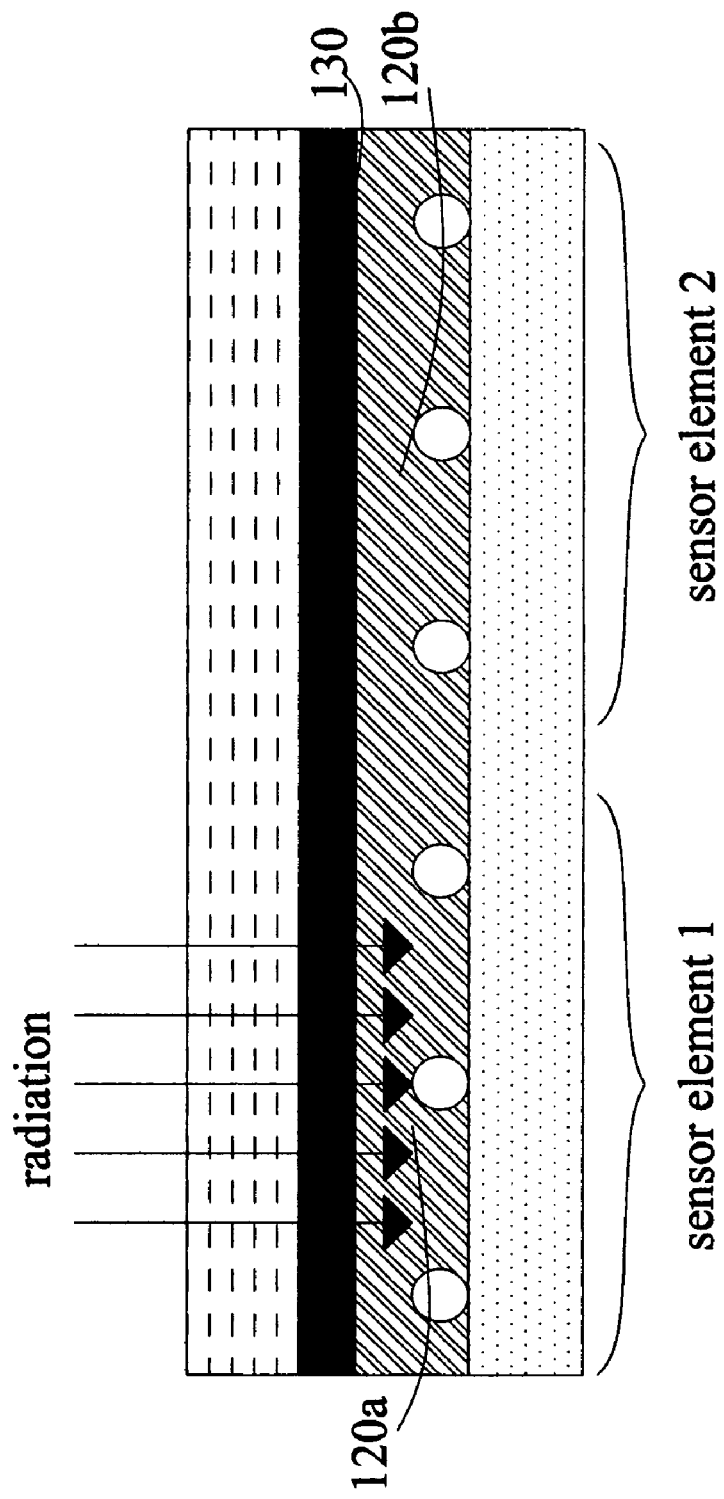

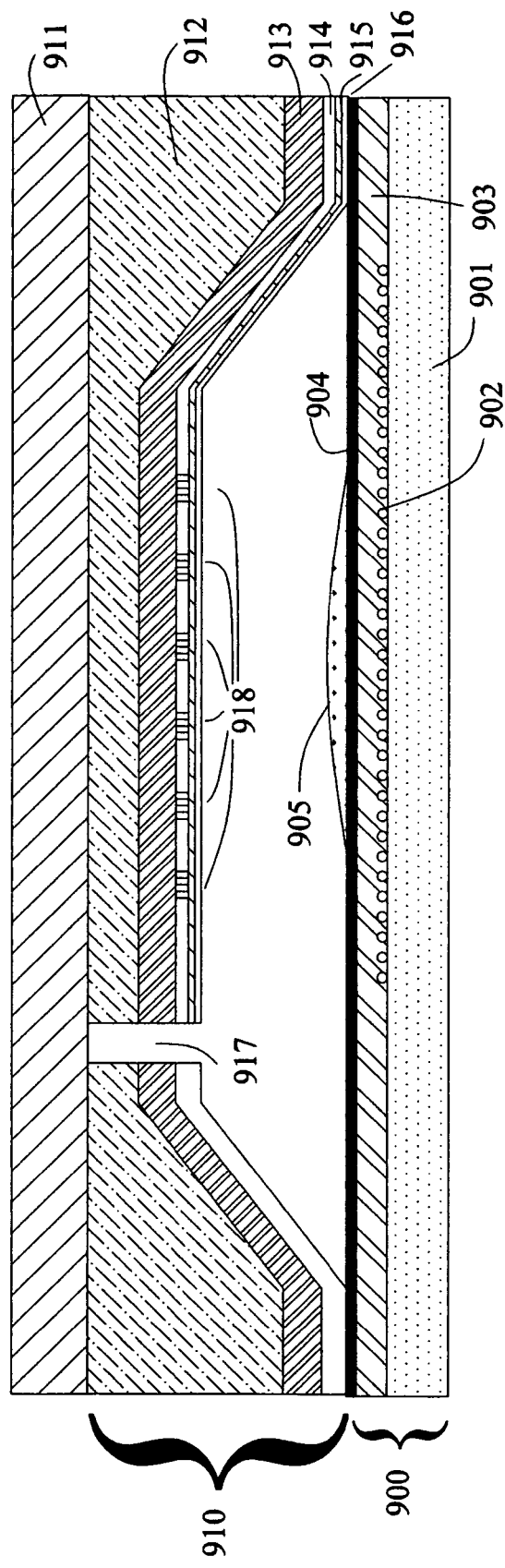

CROSSWIRE SENSOR

CROSS-REFERENCE TO RELATED APPLICATIONS

The following co-pending patent applications, which are incorporated by reference in their entirety, are relevant to the current application:

U.S. application Ser. No. 11/395,237, entitled "Programmable Crossbar Signal Processor," filed Apr. 3, 2006, U.S. application Ser. No. 11/395,238, entitled "Parallel Electron Beam Lithography Stamp (PEBLS)," filed Apr. 3, 2006, U.S. application Ser. No. 11/418,057, entitled "Digital Parallel Electron Beam Lithography Stamp," filed May 5, 2006, and U.S. application Ser. No. 11/446,236, entitled "Crosswire Radiation Emitter" filed concurrently with the present application.

FIELD OF THE INVENTION

The present invention pertains to a sensing device which may be used for a variety of sensing functions including pattern recognition or comparison and image tracking. The sensor may also be used in electron microscopy devices.

BACKGROUND OF THE INVENTION

Array sensor technologies such as CCD or CMOS sensors have typically included the use of semiconductor or capacitive junctions formed from silicon substrates. However, the recent development of new materials based on nanoparticulate matter or photosensitive molecular films provide an avenue for new sensor technologies which may provide several advantages over the conventional sensor technologies. Kuekes et al. U.S. Pat. No. 7,030,408 provides an example of the formation of nanowires used to form electronic devices. Jang et al. U.S. Pat. No. 7,042,003 provides an example of nanoparticles used in light sensing. It would be beneficial to integrate such systems so that high resolution image sensing may be provided and capabilities such as pattern recognition and formation of image sensors on flexible substrates may be achieved.

SUMMARY OF INVENTION

A sensor array is provided including sensor elements each having a first array of substantially parallel wires and a second array of substantially parallel wires formed at an intersecting angle with the first array of wires. Radiant energy sensitive material, such as photosensitive or electron sensitive material, is coated or formed between the first array of wires and the second array of wires. An input unit is connected to the first array of wires constructed to apply a common signal to the first array of wires. An output unit is connected to the second array of wires and constructed to sum output signals from the second array of wires to produce a summed output. The state of the radiant energy sensitive material determines the summed output.

Uses of the sensor for pattern recognition and comparison are taught. Embodiments using the sensor for electron microscopy are explained.

BRIEF DESCRIPTION OF THE DRAWINGS

FIG. 3 illustrates radiant energy impinging upon one of two adjacent sensor elements.

FIG. 9 illustrates the use of a two-dimensional crosswire sensor array with a corresponding two-dimensional electron emission array to form an electron microscopy device.

DETAILED DESCRIPTION OF THE INVENTION

Figure 1:
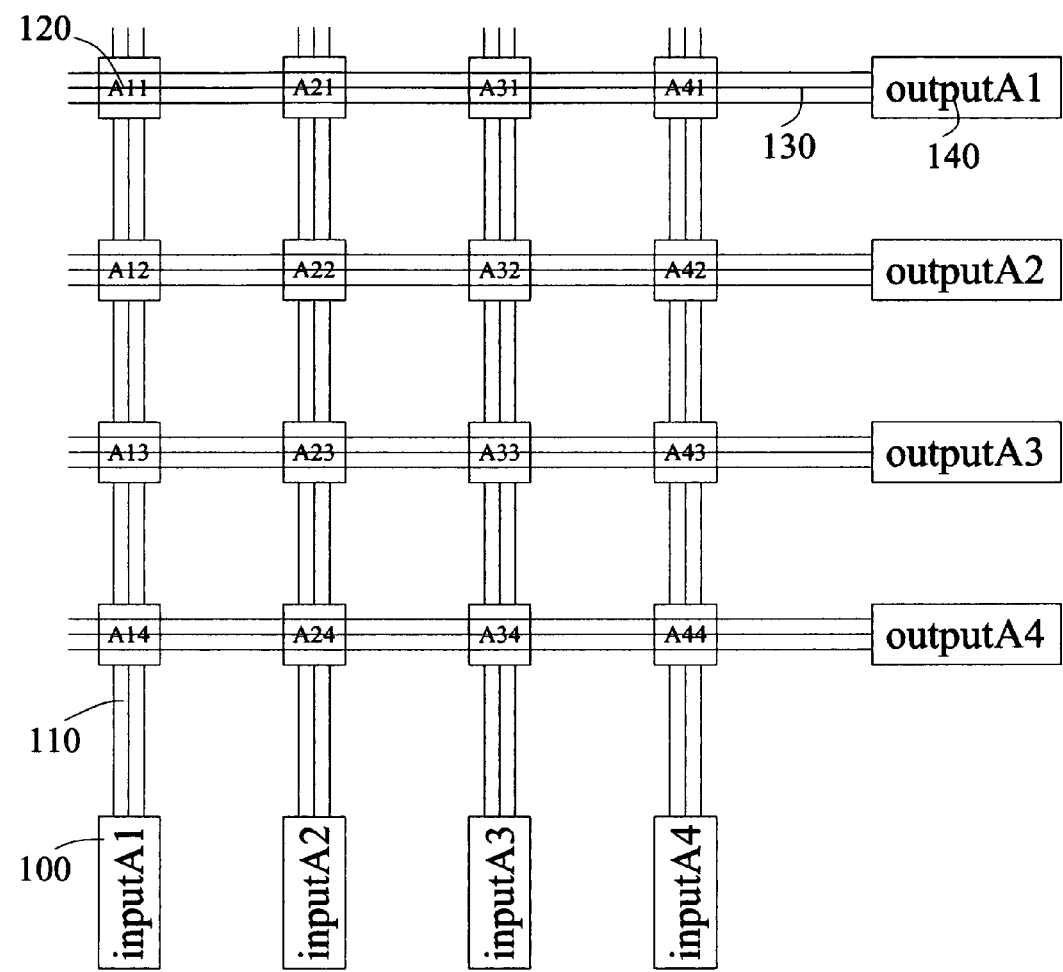
FIG. 1 illustrates a top view of a crosswire sensor array according to a basic embodiment of the present invention.

FIG. 1 illustrates a basic embodiment of the present invention. Input units 100 (inputA1, inputA2, inputA3, inputA4) each provide a common signal to a first array of parallel metallic or p-doped wires 110. A radiant energy sensitive material 120 is coated or formed above the wires 110 and a second array of parallel metallic or n-doped wires 130 are formed above material 120. Wires 130 are connected to output units 140 (outputA1, outputA2, outputA3, outputA4) which are provided to sum the signals input from the wires 130. Sixteen sensor elements A11-A44 are shown in a 4×4 sensor array.

Figure 2A:
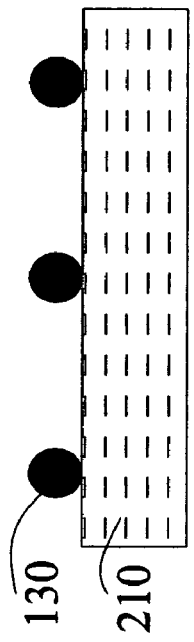
FIGS. 2a and 2b illustrate two cross-sections of a particular sensor element prior to fabrication.
Figure 2B:
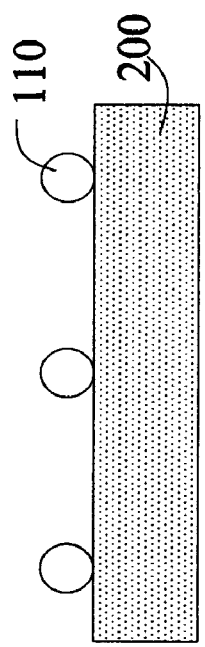

FIGS. 2a and 2b illustrate two cross-sections of a particular sensor element prior to fabrication. In FIG. 2a, a substrate 200 is provided, which may be opaque, reflective, or transparent, depending upon the desired application. Wiring 110 may be patterned on the substrate using a chemical or physical deposition technique as commonly used in the semiconductor processing industry. For nanoscale resolution wiring, other techniques may be employed including nanoimprint lithography, copolymer self-assembly, or a PEBLS technique as disclosed in copending U.S. patent applications Ser. Nos. 11/395,238 and 11/418,057. In addition, silkscreen printing or inkjet printing may be utilized to pattern the wiring if the substrate 200 is desired to be a flexible film. The wiring 110 should be formed of a p-doped conductive material or, equivalently, as a metallic material with a p-type surface layer. In FIG. 2b, a transparent substrate 210 is provided with wiring 130 which is patterned in the same or a similar manner as wiring 110 except the wiring is made from an n-doped material or a metallic material with an n-type surface layer. The p-doping and n-doping of the separate wiring arrays allows for avoidance of unwanted feedback so that current flow occurs primarily only in the direction from wiring 110 to wiring 130. Molecular film or composite material 120 formed using nanoparticles (such as used in Jang et al. U.S. Pat. No.

Figure 2C:
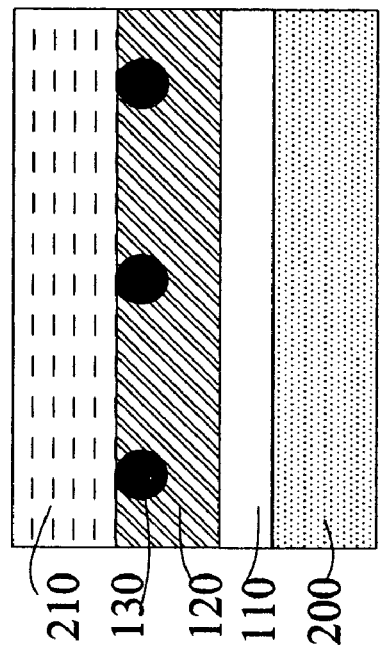
FIGS. 2c and 2d illustrate two cross-sections of a particular sensor element after fabrication.
Figure 2D:
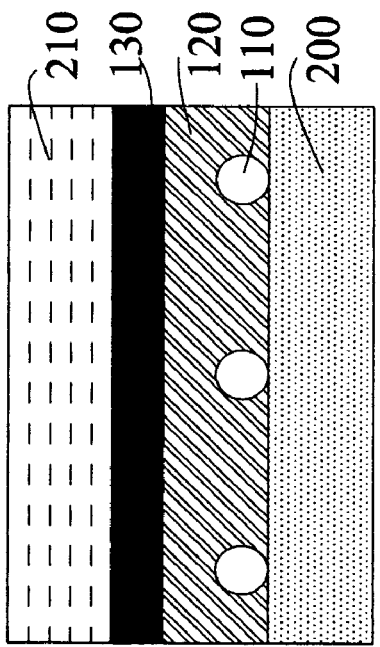

7,042,003) may be coated on the substrate of FIG. 2a or 2b. FIG. 2c illustrates a cross-section of the sensor element parallel to wiring 130 and FIG. 2d illustrates a cross-section of the sensor element parallel to wiring 110.

FIG. 3 illustrates two adjacent sensor elements. Depending upon the type or wavelength of radiation desired to be detected, appropriate filtering and optics may be used to direct the desired radiation to the array of sensor elements. The radiation, in the form of electromagnetic energy (photons), electrons, or ions passes through the spaces between wiring 130 so as to interact with the radiation sensitive material 120. The material 120 may be tuned to respond to a specific radiation in various ways. For example, if the material 120 consists of quantum dots (such as CdSe or CdS nanocrystals) in a suspension, the size of the quantum dots determine the wavelength of radiation to which the material is sensitive. For molecular films, such as organic semiconductors, the bandgap of the material chosen determines the sensitivity to incident ions, electrons, or photons interacting with the material. U.S. Pat. No. 4,837,435 provides examples of materials that increase their conductivity under light irradiation. When different amounts of the targeted radiation is impinged upon different sensor elements, as shown in FIG. 3, the materials electrical characteristics change accordingly.

Figure 4B:
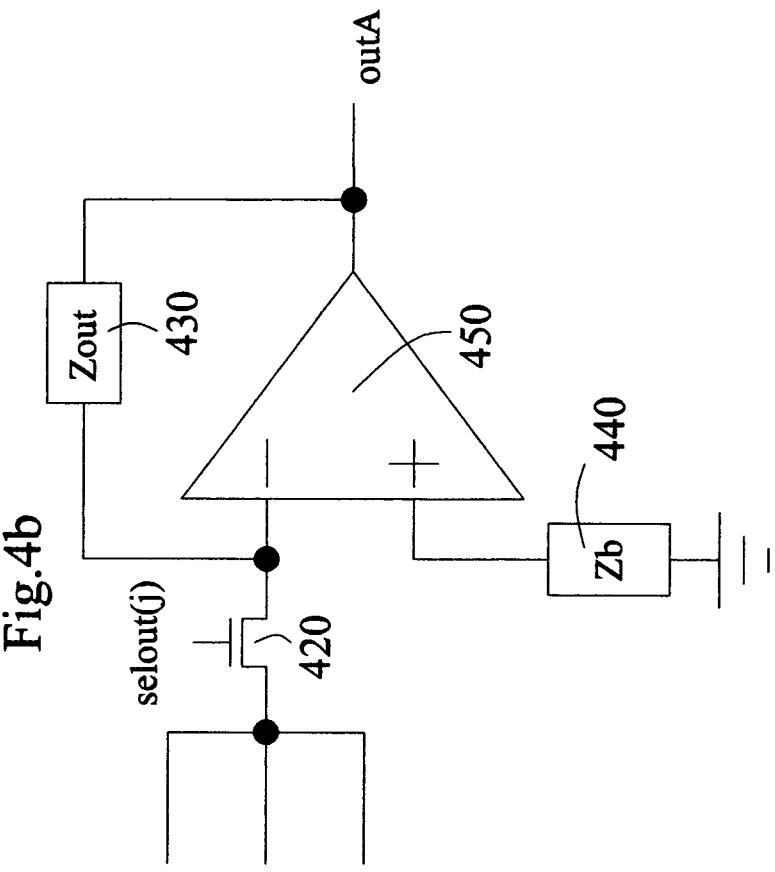
FIG. 4b illustrates an embodiment of an output unit for the crosswire sensor array.
Figure 4A:
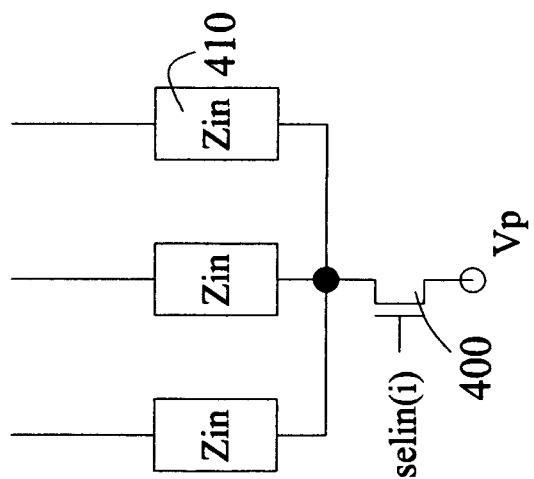
FIG. 4a illustrates an embodiment of an input unit for the crosswire sensor array.

FIG. 4a illustrates an embodiment of an input unit 100 while FIG. 4b illustrates an embodiment of output unit 140. In the input unit, a common voltage $V_p$ is selectively applied via actuation of transistor 400 (conceivably other switching mechanisms such as MEMS switches may be utilized for this function). $Z_{in}$ 410 is representative of the impedance resulting from resistive/capacitive/inductive effects in the input wiring 110. In the output unit, selective actuation of transistor 420 (again other switching mechanisms may be used) transmits a signal via op-amp 450. Feedback resistance $Z_{out}$ 430 and balancing resistance $Z_b$ 440 for current balancing are applied to the op-amp 450. A particular sensor element may be addressed via a control unit such as a general purpose microprocessor under software control, or alternatively by an application specific integrated circuit, by providing an actuation signal selin(i) ($1 \leq i \leq N$) to select a particular column and providing an actuation signal selin (j) ($1 \leq j \leq M$) to select a particular row. N and M refer to the number of respective columns and rows in the matrix of sensor elements. Depending on the desired application, the values of N and M may vary from 1 to several thousand. When a single sensor element is actuated the total circuit configuration behaves as a summing amplifier and the overall output voltage may be approximated by $$outA = -Z_{out}/[Z_{in}/3 + Z_{rad}] * V_p. \qquad \text{Eq1}$$

$Z_{rad}$ is representative of the impedance value due to the radiant energy sensitive material 120. Depending upon whether or not the material 120 is interacting with a radiant energy (photons, electrons, ions) the value of $Z_{rad}$ will shift. By tuning $Z_{out}$ and/or $Z_{in}$ during manufacture such that $Z_{out} = Z_{in}/3$, Eq1 may be simplified to $$outA = -1/[1 + Z_{rad}/Z_{out}] * V_p. \qquad \text{Eq2}$$

$Z_{out}$ may be tuned during manufacture to the average of the value of $Z_{rad}$ upon interaction with the target radiant energy and the value of $Z_{rad}$ when there is no interaction with the target radiant energy. A comparator may be used to determine if outA is above a threshold level indicating sufficient actuation of a selected pixel element. It is noted that the values of $Z_{in}$ may be manufactured to be different for different columns, while $Z_{out}$ may be manufactured to be different for different rows, in order to balance parasitic differences in column/rows due to different total wiring lengths (see co-pending U.S. patent application Ser. No. 11/395,237 for further details on parasitic balancing).

Progressive selection of all of the sensor elements in a two dimensional array provides for conversion of the radiant energy into a digital image pattern of pixels which may be stored for analysis or further processing as known to a person of ordinary skill in the art of image analysis.

Applications in Pattern Recognition/Comparison

The digital data obtained by the above described sensor array may be used for pattern recognition and comparison. However, if a large amount of data needs to be processed in real time or at a rapid speed the sequential selection of individual sensor elements is inefficient for these tasks. Co-pending U.S. patent application Ser. No. 11/395,237, entitled "Programmable Crossbar Signal Processor" provides mechanisms to transform rasterized image data into horizontal and vertical correlation vectors that may be more readily used in pattern identification and analysis. The following implementation may be used to generate such horizontal and vertical correlation vectors directly from detected images using a crosswire sensor array.

Figure 5A:
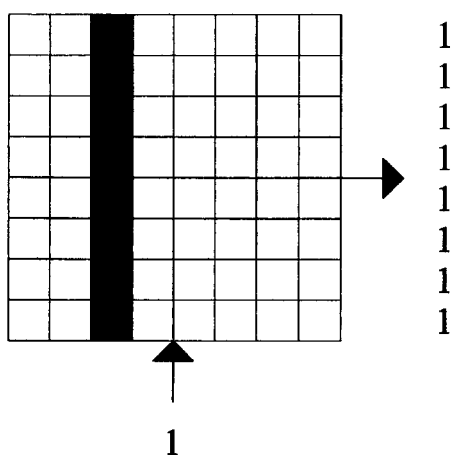
FIG. 5a and 5b illustrate one example of the development of vertical and horizontal correlation vectors from a crosswire sensor array formed from 64 (8×8) sensor elements.
Figure 5B:
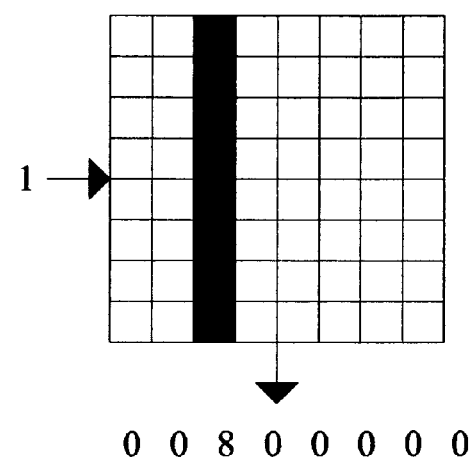

FIGS. 5a and 5b illustrate one example of the development of vertical and horizontal correlation vectors from a crosswire sensor array formed from 64 (8×8) sensor elements. In FIG. 5a, the crosswire sensor array is configured to input a common signal to each column of sensor elements. If the pattern of the incident illumination intensity equally affects one row of sensor elements the corresponding vertical correlation vector will consist of a uniform intensity output. FIG. 5b illustrates a crosswire sensor array rotated 90 degrees from the example of FIG. 5a so that the input unit is connected to the sensor element rows from the left while the output unit is connected to the sensor element columns from the bottom. The resultant output corresponds to a horizontal correlation vector indicating a high output for the third column. The combined vertical and horizontal correlation vectors obtained by simultaneously projecting the same image of the crosswire sensor arrays of FIG. 5a and FIG. 5b may be used to form a signature for the image. The correlation vectors may be stored in a memory for later use or directly compared with a database of horizontal/vertical correlation vectors previously stored in memory. This allows for image identification to be performed more quickly then if individual pixels were to be compared. In the current example 16 analog values are formed (8 for the horizontal correlation vector and 8 for the vertical correlation vector) for comparison whereas 64 comparisons would be necessary if the results of each sensor element were analyzed independently. While comparison of analog values does not offer the precision of comparing binary or digital data, pattern recognition applications would typically require searches for the closest rather than an exact image match.

Figure 5C:
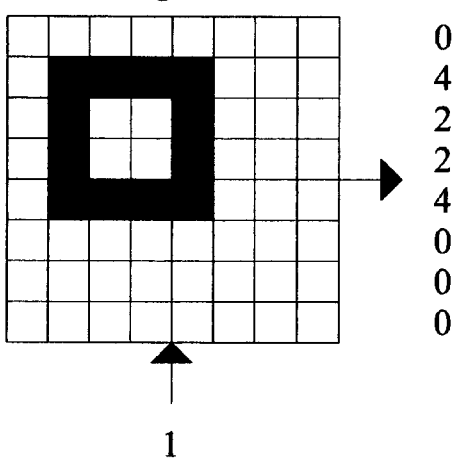
FIGS. 5c and 5d illustrate another example of image recognition in which both the position and shape of a pattern are identified.
Figure 5D:
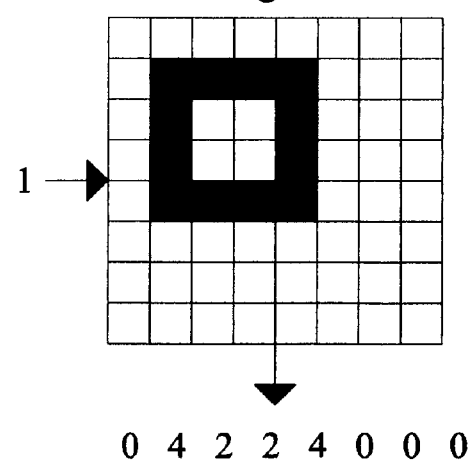

FIGS. 5c and 5d illustrate another example of image recognition in which both the position and shape of a pattern are identified. For example, a black square pattern, with a white square pattern of half the size embedded therein, may be identified with stored horizontal and vertical correlation patterns such as [(2 1 1 2), (2 1 1 2)]. Though the particular magnitude and position of a detected pattern using horizontal and vertical correlation vectors may differ from the stored value, this difference may actually be useful to ascertain the coordinates of the image and the relative intensity of the image.

For example, the average analog value R of a correlation vector may be found using the algorithm $R = \Sigma f(n)/N$, the summation performed over $1 \leq n \leq N$ wherein n represents an ordinal number of the analog values in the correlation vector, f(n) represents the analog values corresponding to the ordinal numbers n, and N represents the maximum ordinal number (i.e. size) of the correlation vector. The mean coordinate X of a correlation vector may be found using the algorithm $X=\Sigma[nf(n)]/\Sigma f(n)$, the summations performed over $1 \leq n \leq N$. For a correlation vector (0 4 2 2 4 0 0 0), N=8, $\Sigma f(n)$=12, $\Sigma nf(n)$=42, R=1.5, X=3.5. For a correlation vector (0 0 2 1 1 2 0 0), N=8, $\Sigma f(n)$=6, $\Sigma nf(n)$=27, R=0.75, X=4.5. It can readily be seen that the relative mean coordinates X and average values R of detected and stored correlation vectors may be used in feedback control for image tracking and magnification control (for the given example the difference in mean coordinates 4.5−3.5=1 is indicative of the necessary repositioning while the ratio of the average values 0.75/1.5=0.5 is indicative of the magnification adjustment).

Figure 6A:
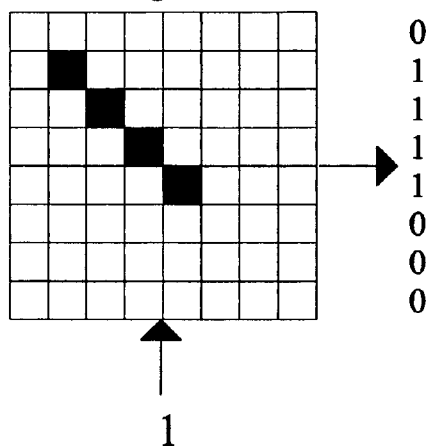
FIGS. 6a and 6b illustrate an example of different patterns that produce identical correlation vectors.
Figure 6B:
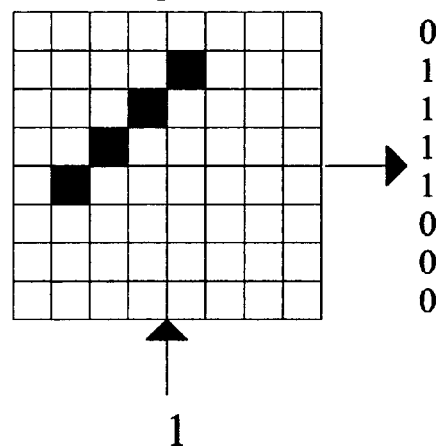
Figure 6C:
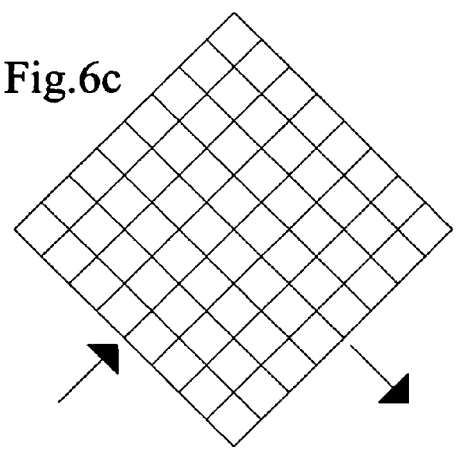
FIG. 6c illustrates a crosswire sensor array formed at a 45 degree angle with respect to the crosswire sensors used to produce the horizontal or vertical correlation vectors.

It is important to note that a horizontal and vertical correlation vector does not uniquely describe a particular pattern and can not be used to reconstruct a pattern. FIGS. 6a and 6b illustrate an example of different patterns that produce identical correlation vectors. Additional correlation vectors may be obtained to achieve a more specific signature for distinguishing between such patterns. FIG. 6c illustrates a crosswire sensor array formed at a 45 degree angle with respect to the crosswire sensors used to produce the horizontal or vertical correlation vectors. Such a crosswire sensor would produce a diagonal correlation vector.

Figure 7A:
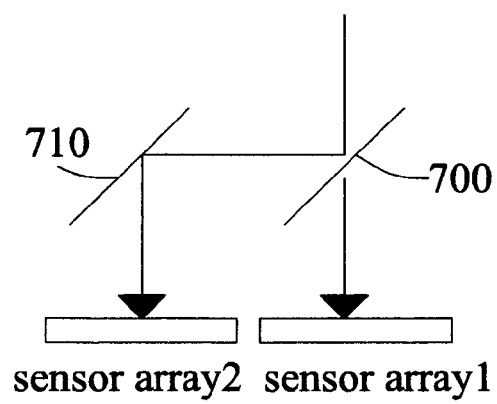
FIGS. 7a and 7b illustrate how an identical image pattern may be directed to spatially separated crosswire sensors.
Figure 7B:
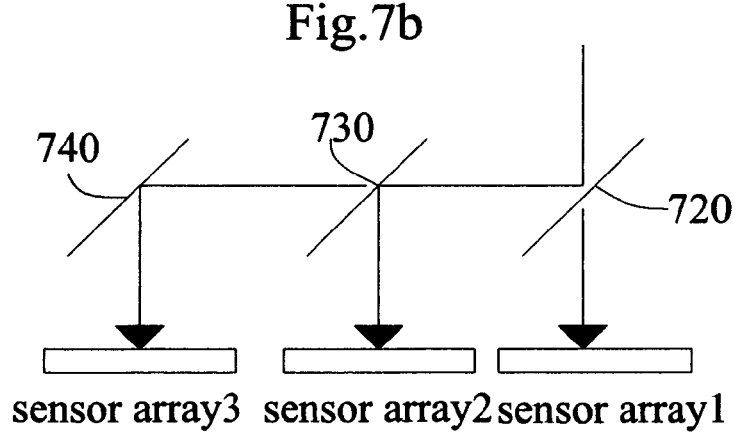

FIGS. 7a and 7b illustrate how an identical image pattern may be directed to spatially separated crosswire sensors. Initially preliminary optics such as a filter corresponding to a particular frequency of interest, a lens system used to focus light and/or any other useful optical preprocessing systems known to those of ordinary skill in image sensing may obviously be used. In FIG. 7a, semi-transparent mirror 700 is placed at a 45 degree angle with the incident light. The mirror is formed so as to reflect and transmit nearly the same amount of light so that half of the incident light is directed to image sensor array 1, which may be used to produce a horizontal correlation vector. Mirror 710 is also placed at a 45 degree angle with incident light and formed to be completely reflective resulting in the remaining half of the light to be incident on image sensor array 2, which may be used to produce a vertical correlation vector. In FIG. 7c, a similar system is shown except semi-transparent mirror 720 is formed to transmit a third of the light and reflect two-thirds of the light, semi-transparent mirror 730 reflects half the light and transmits the other half and mirror 740 is completely reflective. Such a system is designed to provide equal light intensities on sensor arrays 1, 2, and 3, which may be used to produce respective horizontal, vertical, and diagonal correlation vectors. As an alternative to semi-transparent mirrors, birefringent optics may be used to separate the incoming light. Multicolor (i.e. blue, green, red, etc.) image sensing also may be accomplished by replicating such a system with different filters or by using a color wheel or other variable filter mechanism to focus on different light frequencies.

While the above description enables simultaneous formation of correlation vectors using multiple sensor arrays other techniques are conceivable such as the use of a turret on which a single crosswire sensor array may be mounted and rotated. This would allow for the use of fewer sensor arrays but would require that the image being detected is changing slowly (or not at all) with respect to the speed of rotation of the crosswire sensor between different angular states (horizontal, diagonal, vertical) to allow for sequential detection of the corresponding correlation vectors.

Figure 8A:
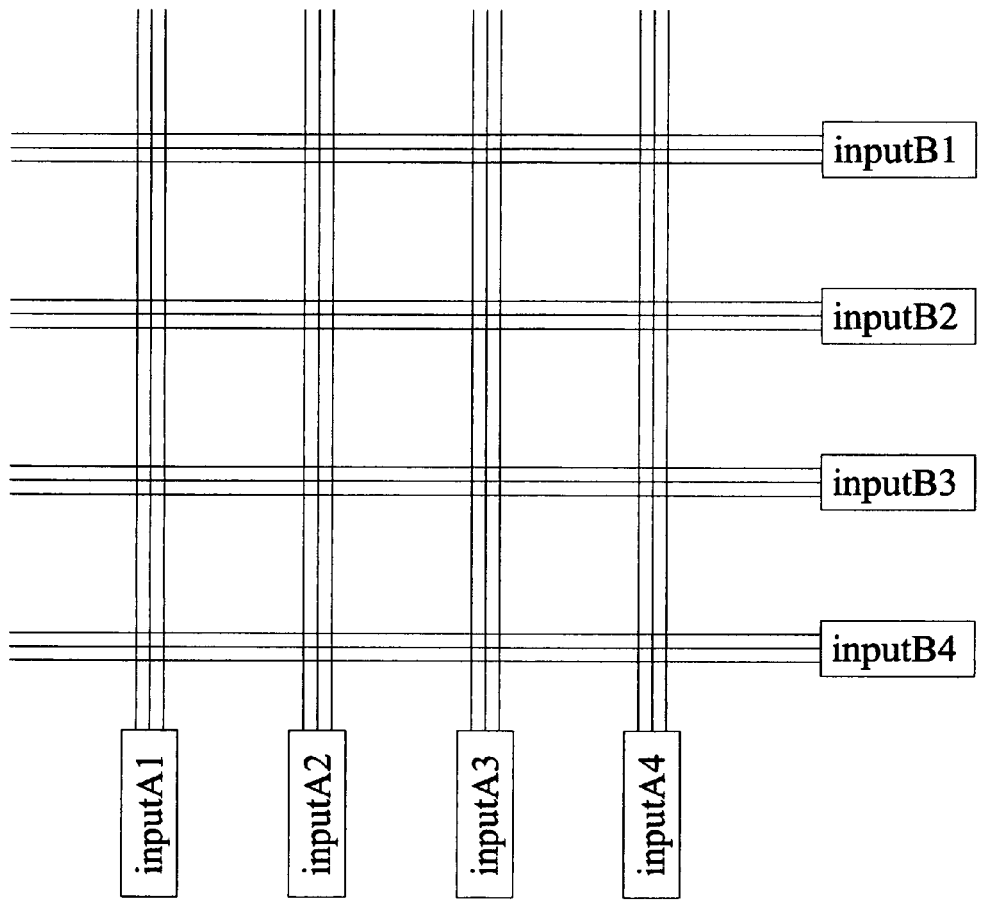
FIGS. 8a and 8b illustrate an embodiment of a single crosswire sensor array capable of producing both a horizontal and vertical correlation vector.
Figure 8B:
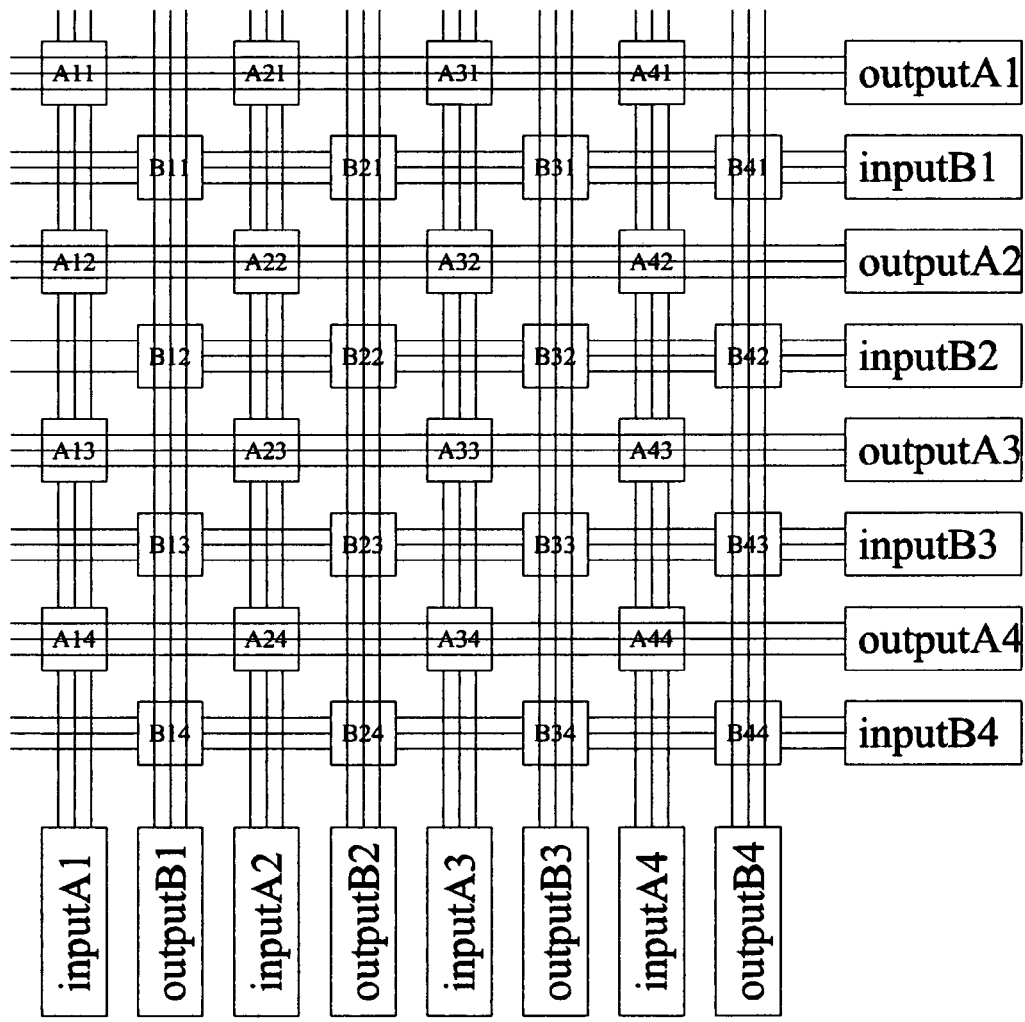

Yet another technique would be combining the capabilities for generating horizontal and vertical correlation vectors in a single crosswire sensor array. FIG. 8a illustrates the formation of a pattern of input wires and associated circuitry formed for such a sensor array. Inputs coming from both the horizontal and vertical direction are provided and electrical isolation such as a patterned insulation film may be formed at the intersections between the wires from inputA1-A4 and the wires from inputB1-B4. Output wiring and associated output circuitry may similarly be formed on a separate substrate. Deposition of the radiant energy sensitive material may then be performed on one of the substrates. The two substrates may be aligned with an offset between the separate wiring patterns and bonded together so as to form the structural arrangement of FIG. 8b. OutputsA1-A4 may be used to generate the vertical correlation vector and outputsB1-B4 may be used to generate the horizontal correlation vector.

The use of the crosswire sensor array in pattern recognition may be combined with various feedback control systems such as used in robotics, microrobotics, automated vehicular control, etc. Feedback may also be provided to control the preliminary optics to determine magnification and directional orientation (translation/rotation) of the image exposed to the sensor array or arrays. For example, in the case of FIG. 5c and 5d, the detected correlation vectors may be used to adjust the optics to center and enlarge the image to provide for higher resolution image analysis or to provide for image tracking such as tracking the position of a celestial body, a missile or projectile, or other non-stationary target.

Applications in Electron Microscopy

Using nanowires in the formation of the crosswire sensor array of the present invention and using electron sensitive material as the radiant energy sensitive material allows for the possibility of a high resolution image sensing device for use in conventional transmission or scanning electron microscopy. However, conventional electron microscopy usually requires beam focusing elements, a high vacuum environment, and high energy electron beams adding much expense to electron microscopy. U.S. Pat. No. 4,618,767 describes an alternate arrangement for electron microscopy in which the electron emission source is spaced less than 100 nm from the sample being investigated. This configuration requires far less energy for the electron beam and allows for a more compact microscopy system. Co-pending U.S. patent application Ser. No. 11/418,057, entitled "Digital Parallel Electron Beam Lithography Stamp," and incorporated by reference in its entirety, teaches the formation of a massively parallel array of electron emitting carbon nanotube tips for high throughput nanolithography applications. Carbon nanotubes have a remarkably high electron emission efficiency with relatively little applied energy. The array of carbon nanotube tips taught in the '057 application may be combined with the crosswire sensor array of the present invention as further described in relation to FIG. 9.

In FIG. 9, a crosswire sensor array 900, as earlier described, is provided with a base substrate 901, a first array of parallel p-type nanowires 902, an electron sensitive material 903, and a second array of parallel n-type nanowires 904, formed perpendicular to wires 902. As opposed to the earlier described embodiments of the crosswire sensor array, a transparent layer is not included adjacent to wires 904. Parallel electron beam element 910, as described in the '057 application, includes a microfluidic control substrate 911, an anisotropically etched Si substrate 912, anodic aluminum oxide layer 913, insulating layer 914, conductive wiring 915, and insulation film 916. A fluidic supply channel 917 allows for fluid delivery by electrophoretic of other microfluidic pumping technique. A two-dimensional array of electron emission regions 918 are formed from closely spaced vertically oriented nanotubes. Actuation of selected electron emission regions is determined by a crosswire addressing scheme. Intertube spacing of high density nanotube arrays has been achieved of the order of 10-100 nm with optimal field emission occurring when the extension of the nanotubes beyond the AAO layer 913 is approximately the same as the intertube spacing. Bonding the crosswire sensor array 900 and parallel electron beam element 910 together creates an enclosed region to which a supply of biological or other material that is desired to be analyzed may be delivered. The distance between the electron emission regions 918 and the crosswire sensor array 900 may be of the order of 100 nm-100 microns depending on the etch depth of substrate 916.

In order to calibrate such a system prior to use a partial vacuum may be applied to the enclosed region via microfluidic pumping via channel 917. Each electron emission region 918 may be actuated and the corresponding sensor element or elements of the crosswire sensor array 900 may be detected. A listing of corresponding addresses of electron emission elements and sensor elements may be stored in a memory as well as the detected intensities under the partial vacuum in which no specimen is present. Biological or other material may then be pumped into the enclosed region and subsequently evacuated leaving a partial vacuum with some residual quantities of specimen material 905 left behind on the surfaces (optionally a thin film may be provided on the surface of the electron emission regions 918 or the crosswire sensor array to promote adhesion on one of these surfaces). Electron emission regions and corresponding sensor elements may then be sequentially actuated and the results compared with those from the case in which the material 905 was not present. A cleansing agent may be pumped in to remove the residual material 905 and return the enclosed region to its initial state.

The electron microscopy system as described above may allow for a smaller, more compact electron microscopy tool useful in portable and handheld analysis tools and may be combined with the various microfluidic analysis systems commonly employed.

MODIFICATIONS/ALTERNATIVES

It is noted that in the above description provides illustrative but non-limiting examples of the present invention. In some examples, the number of wires in the first wiring 110 and second wiring 130 of a sensor element was set to be three. However, depending on the diameter of the wires and the interspacing between wires, the number of intersecting wires may be anywhere from 2×2 to over 100×100 per sensor element. Clearly using a larger number of wires of a given diameter will have the advantage of fault tolerance of broken or corrupt wire paths while using a smaller number of wires of a given diameter will have the advantage of higher resolution image detection. The particular diameter of the wires used may range from below 10 nm to above 10 microns depending on the intended use and fabrication procedure employed. Also, if the radiant energy sensitive material is chosen to be sensitive to electromagnetic radiation, the wavelength of the radiation desired to be detected may effect the interspacing between the wires. For example, detection of visible light may require wire interspacing above 400 nm. However, the wiring array incident to incoming electromagnetic waves may also be advantageously employed to polarize the waves. EM radiation in the microwave, infrared, visible, ultraviolet, and x-ray spectrum may be suitable for detection depending on the wiring spacing, dimensions and radiation sensitive material used. While above embodiments have associated first wiring 110 with substrate 200 and second wiring 130 with transparent substrate 210 this association may be reversed.

While an 8×8 sensor element array has been illustrated as an example, arrays of smaller (2×2, 3×3, etc) or larger size (100×100, 1000×1000, etc.) may be used. In addition differing numbers of rows than columns may obviously be employed such as 2×8, 8×2, 50×200, etc.

The input and output circuits may be formed on the same substrate (to reduce parasitic wiring loss) or a different substrate (to ease fabrication of different components) from the array of wires and radiant energy sensitive material. In addition, when formed on different substrates, wireless techniques may be advantageously used to communicate from a control circuit containing the input and output circuits and the substrate with the radiant energy sensitive material. RF transponders are one available technology to enable such communication.

Analog output values were indicated in the development of the correlation vectors. These analog values may of course be converted to digital values using arrays of analog to digital converters to facilitate further processing by a digital computer.

Many possible applications are seen to exist for the technology of the present invention and while particular discussion of pattern recognition and electron microscopy embodiments have been taught above the present invention is not limited to such applications.

The present invention is only limited by the following claims.

I claim:

1. A sensor element comprising:
a first array of substantially parallel wires;
a second array of substantially parallel wires formed at an intersecting angle with the first array of wires;
radiant energy sensitive material between the first array of wires and the second array of wires;
an input unit connected to the first array of wires and constructed to apply a common signal to the first array of wires; and
an output unit connected to the second array of wires and constructed to sum output signals from the second array of wires to produce a summed output, wherein
the response of the radiant energy sensitive material to incident radiation determines the summed output.

2. A sensor element of claim 1, wherein the radiant energy sensitive material is photosensitive material.

3. A sensor element of claim 1, wherein the radiant energy sensitive material is a molecular film.

4. A sensor element of claim 1, wherein the radiant energy sensitive material is a composite material including nanoparticles.

5. A sensor element of claim 1, wherein the radiant energy sensitive material is sensitive to electrons or ions.

6. A sensor element of claim 1, wherein the wires of the first array of wires and the second array of wires have a diameter of less than 100 nm.

7. A sensor element of claim 1, wherein the wires of the first array of wires and the second array of wires have a diameter equal to or greater than 100 nm.

8. A sensor element of claim 1, wherein the first array of wires are p-doped and the second array of wires are n-doped.

9. A sensor element of claim 1, wherein the first array of wires is formed adjacent a reflective surface.

10. A sensor element of claim 1, wherein the first array of wires is formed adjacent an opaque surface.

11. A sensor element of claim 1, wherein the first array of wires is formed adjacent a transparent surface.

12. A sensor element of claim 1, wherein the second array of wires is formed adjacent a transparent surface.

13. A two-dimensional sensor comprising:
a plurality of sensor elements arranged in columns and rows and an addressing unit for addressing particular sensor elements, wherein each of the sensor elements includes:
a first array of substantially parallel wires;
a second array of substantially parallel wires formed at an intersecting angle with the first array of wires; and
radiant energy sensitive material between the first array of wires and the second array of wires;
and wherein the addressing unit includes:
a plurality of input units, each input unit connected to a particular column of the sensor elements and constructed to selectively apply a common signal to the particular column; and
a plurality of output units, each output unit connected to a particular row of the sensor elements and constructed to selectively sum output signals from the row to produce a summed output, wherein
the response of the radiant energy sensitive material to incident radiation determines the summed output.

14. An image analysis method comprising:
providing the two-dimensional sensor as described in claim 13; and
utilizing the two-dimensional sensor to produce a horizontal correlation vector or a vertical correlation vector for a detected image.

15. The method of claim 14 further comprising comparing the horizontal correlation vector or the vertical correlation vector produced with a stored correlation vector corresponding to a target image.

16. An image analysis method comprising:
providing the two-dimensional sensor as described in claim 13; and
utilizing the two-dimensional sensor to produce both a horizontal correlation vector and a vertical correlation vector for a detected image.

17. An image analysis method comprising:
providing three two-dimensional sensors, each two-dimensional sensor as described in claim 13, wherein each of the two-dimensional sensors is oriented at different angles with respect to one another; and
utilizing the two-dimensional sensors to generate respective image correlation vectors corresponding to the different angles.

18. An image analysis method comprising:
providing the two-dimensional sensor as described in claim 13;
rotating the two-dimensional sensor to different angles; and
utilizing the two-dimensional sensor to generate respective image correlation vectors corresponding to the different angles.

19. An electron microscope comprising:
an electron source; and
the two-dimensional sensor of claim 13.

20. The electron microscope of claim 19, wherein the electron source comprises a two-dimensional array of electron sources, and the two-dimensional array of electron sources and the two-dimensional sensor array form an enclosed space.

* * * * *